United States Patent [19]

White

[11] Patent Number: 5,070,249
[45] Date of Patent: Dec. 3, 1991

[54] PHOTOMULTIPLIER TUBE MOUNTING FOR WELL LOGGING DETECTORS

[75] Inventor: John A. White, Chagrin Falls, Ohio

[73] Assignee: Bicron Corporation, Newbury, Ohio

[21] Appl. No.: 449,999

[22] Filed: Dec. 12, 1989

[51] Int. Cl.$^5$ .............................................. G01T 1/20
[52] U.S. Cl. ............................... 250/483.1; 250/261; 250/239; 250/361 R
[58] Field of Search ................. 250/239, 483.1, 485.1, 250/361 R, 368, 261, 256

[56] References Cited

U.S. PATENT DOCUMENTS

| | | | |
|---|---|---|---|
| 3,265,893 | 8/1966 | Rabson et al. | 250/261 |
| 4,158,773 | 6/1979 | Novak | 250/368 |
| 4,383,175 | 5/1983 | Toepke | 250/368 |
| 4,833,320 | 5/1989 | Hurlbut | 250/256 |

Primary Examiner—Carolyn E. Fields
Attorney, Agent, or Firm—Pearne, Gordon, McCoy & Granger

[57] ABSTRACT

A scintillation detector providing a photomultiplier tube mounting system capable of withstanding substantial vibration and the like without damage to the photomultiplier tube. The mounting system provides a resonant frequency substantially above the frequency of the vibration normally encountered to prevent amplification of the vibration. The photomultiplier tube is mounted within a support tube with a thin layer of elastomeric material. The support tube is in turn mounted in a light-tight tube by spaced elastomeric rings having a relatively high spring rate. The support tube is provided with openings which render the support tube radially resilient so that thermal expansion of the elastomeric material between the support tube and the photomultiplier tube does not result in high compressive loads on such tube. Further, the elastomeric material can elastically flow into the openings in the support tube to relieve compressive stresses which would otherwise occur.

13 Claims, 4 Drawing Sheets

PHOTOMULTIPLIER TUBE MOUNTING FOR WELL LOGGING DETECTORS

BACKGROUND OF THE INVENTION

This invention relates generally to electro-optic devices of the type used in nuclear radiation detection, and more particularly to a novel and improved mechanical support for photomultiplier tubes in such devices.

PRIOR ART

Scintillation detectors are often incorporated into drilling tools for oil wells and the like. Such detectors combine a scintillation capsule optically coupled to a photomultiplier tube. In the environment of a drilling tool, such detectors are subject to substantial vibration, both in a rotary direction and in an axial direction. Examples of such detectors are described in U.S. Pat. Nos. 4,383,175 and 4,833,320, both assigned to the assignee of this invention. Such patents are incorporated herein by reference.

Generally in the past, the photomultiplier tube has been supported or potted in a relatively thick mass of elastomeric material, such as a silicone elastomer. Further, in such detectors, the tubes have normally been firmly pressed by springs or the like against the optical coupler.

Such systems tend to provide a relatively low resonant frequency which is in the same general frequency range as the vibration and shock frequency experienced by the operating tool. Consequently, the vibration and shocks are often greatly magnified, causing premature photomultiplier tube failures.

Further, such tools are required to function in a very high temperature environment, such as 210° C. In such instances, the thermal expansion of the supporting elastomer can produce high destructive compressive forces on the tube. Additionally, the axial force of engagement with the optical coupler can result in stresses on the face plate of the tube which are sufficient to break such face plate or fracture the joint at its periphery where it is joined to the remainder of the tube body.

Further, in a typical installation in which the photomultiplier tube has been potted, for instance in an elastomeric material, directly to the light-tight enclosure, difficulty is encountered when it is necessary to remove a tube for repair or the like.

SUMMARY OF THE INVENTION

There are a number of aspects to the present invention. In accordance with one important aspect, a support system is provided that has a resonant frequency which is substantially higher than the frequencies of normally encountered vibration and shock. This prevents or minimizes the occurrence of vibration and shock amplification. Further, the resilience of the mounting system tends to dampen and reduce even the unamplified vibration and shocks.

Another aspect of this invention involves a tube mounting system in which elevated temperatures do not produce damaging compressive stresses on the walls of the photomultiplier tube.

Still another aspect of this invention involves a support system and optical coupler combination where thermal expansion or vibration shocks do not produce excessive forces on the face plate of the tube.

A still further aspect of this invention involves a mounting system which allows easy removal and reinstallation of a photomultiplier tube when service is required.

In the illustrated embodiment, the photomultiplier tube itself is mounted in a metal support tube sized to closely fit the photomultiplier tube by a thin layer of elastomeric adhesive such as silicone rubber. The reduction in the thickness of the elastomeric layer produces a two-fold advantage. First, the thin layer provides a much higher spring rate and contributes to a higher resonant frequency for the support system. Second, a smaller mass of elastomeric material has less volumetric expansion when encountering high temperatures.

In order to further prevent high compressive stresses, the support tube is formed with slots which provide radial flexibility of the support tube. The volumetric expansion of the elastomeric material can therefore expand the support tube and release the compressive stresses on the wall of the photomultiplier tube. Further, the elastomeric material can elastically deform into the slots to prevent high compressive stress.

The support tube provides radial flanges adjacent to its ends. These flanges tend to prevent adjacent radial deflection. However, since they do not have a substantial axial extent, the elastomeric material can relieve compressive stresses by axial elastic displacement. Further, the flanges are located along zones of substantial photomultiplier strength.

The support tube is radially located within a light-tight enclosure by elastomeric high rate springs positioned between the support tube flanges and the enclosure. The illustrated springs are commercially available elastomeric rings typically used as seals in fluid actuators and the like. The confinement of these seals/springs is dimensioned to provide a preload that contributes to the establishment of a relatively high resonant frequency substantially above the frequency of the system vibrations and shocks normally encountered.

The axial position of the photomultiplier tube assembly is established by engagement of the forward flange of the support tube and a shoulder on the light-tight enclosure. An axial spring is provided to bias the support tube toward such engagement. This structure, which axially positions the photomultiplier tube independent of the optical coupler, prevents excessive axial loading of the face plate of the photomultiplier tube.

The optical coupling between the face plate of the photomultiplier tube and the scintillation material is provided by a very thin layer of viscous elastic material which functions to provide an effective optical coupling without the typical axial loading. Consequently, the photomultiplier tube face plate is not damaged even under severe vibration and shock occurrences.

The axial positioning spring is held in place by a removable snap ring. Therefore, the support tube with its associated photomultiplier tube and radial springs can be removed for repair, etc. by removing the snap ring and withdrawing the photomultiplier tube assembly from the light-tight enclosure.

These and other aspects of this invention are illustrated in the accompanying drawings, and are more fully described in the following specification.

DETAILED DESCRIPTION OF THE DRAWINGS

Figure 1:
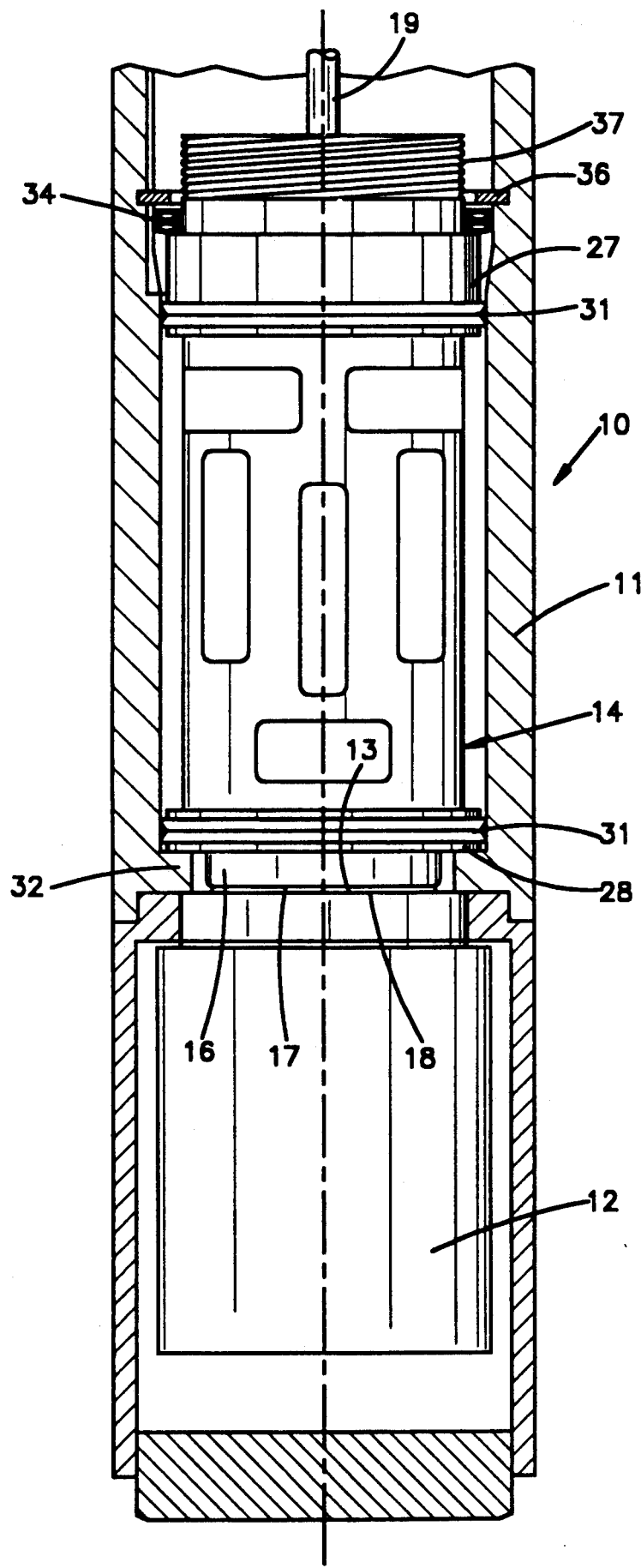
FIG. 1 is a longitudinal view, with the light-tight enclosure shown in section, illustrating one preferred embodiment of a radiation detector incorporating the present invention.

FIG. 1 illustrates an overall radiation detector system 10 with the tubular light-tight enclosure 11 illustrated in longitudinal section. Included within the radiation detector system 10 is a scintillation cell 12, of a type known to those skilled in the art, which produces light bursts which are a function of the radiation reaching the cell. This light is visible through an end face 13 of the cell.

The detector also includes a photomultiplier tube assembly 14 in which a photomultiplier tube 16 is mounted. The photomultiplier tube 16 provides a window-like end plate 17 through which light can enter the tube and which is immediately adjacent to the end face 13 of the cell. An optical coupler 18 is sandwiched between the end face 13 of the cell and the end plate 17 of the photomultiplier tube 16, and provides a good optical connection therebetween. Therefore, the bursts of light generated by the scintillation cell 12 are optically received in the photomultiplier tube 16. The photomultiplier tube 16 operates to generate electrical signals which pass through wiring 19 out of the detector, and which constitute the output of the detector.

When the detector is installed in and used in conjunction with a well drilling tool, for example, the operation of the tool creates an environment for the detector in which the detector is exposed to substantial vibrations and shock. Since photomultiplier tubes, even those tubes constructed to withstand substantial vibration and the like, are somewhat fragile, it is important to mount the tube within the overall system in a mounting system which will minimize the transmission of such vibrations and shocks to the tube itself. It is also very important to arrange such mounting so that the vibrations and shocks are not amplified by resonance, since the amplified vibrations and shocks can result in premature failure of the tube. It is also important to provide a mounting system which does not impose any substantial thermally induced forces on the tube when the detector is operated at high temperatures. It is also important to ensure that the end plate 17 of the photomultiplier is not exposed to damaging forces which can fracture either the end plate or its mounting within the tube body itself.

In accordance with this invention, a photomultiplier mounting is provided which dampens the vibrations and shocks, reducing the magnitude thereof reaching the tube itself. The mounting also minimizes the tendency for resonant amplification of such vibrations and shocks by providing the mounting system with a resonant frequency which is substantially above the normal frequencies of the vibrations and shocks to which the detector is exposed. Further, the mounting system establishes the axial positioning of the photomultiplier tube within the detector and is combined with an optical coupler 18 which does not subject the end plate 17 to excessive loading conditions even under high temperature operating conditions. Still further, the mounting system minimizes stress imposed upon the tube by thermal expansion at elevated temperatures.

Figure 2:
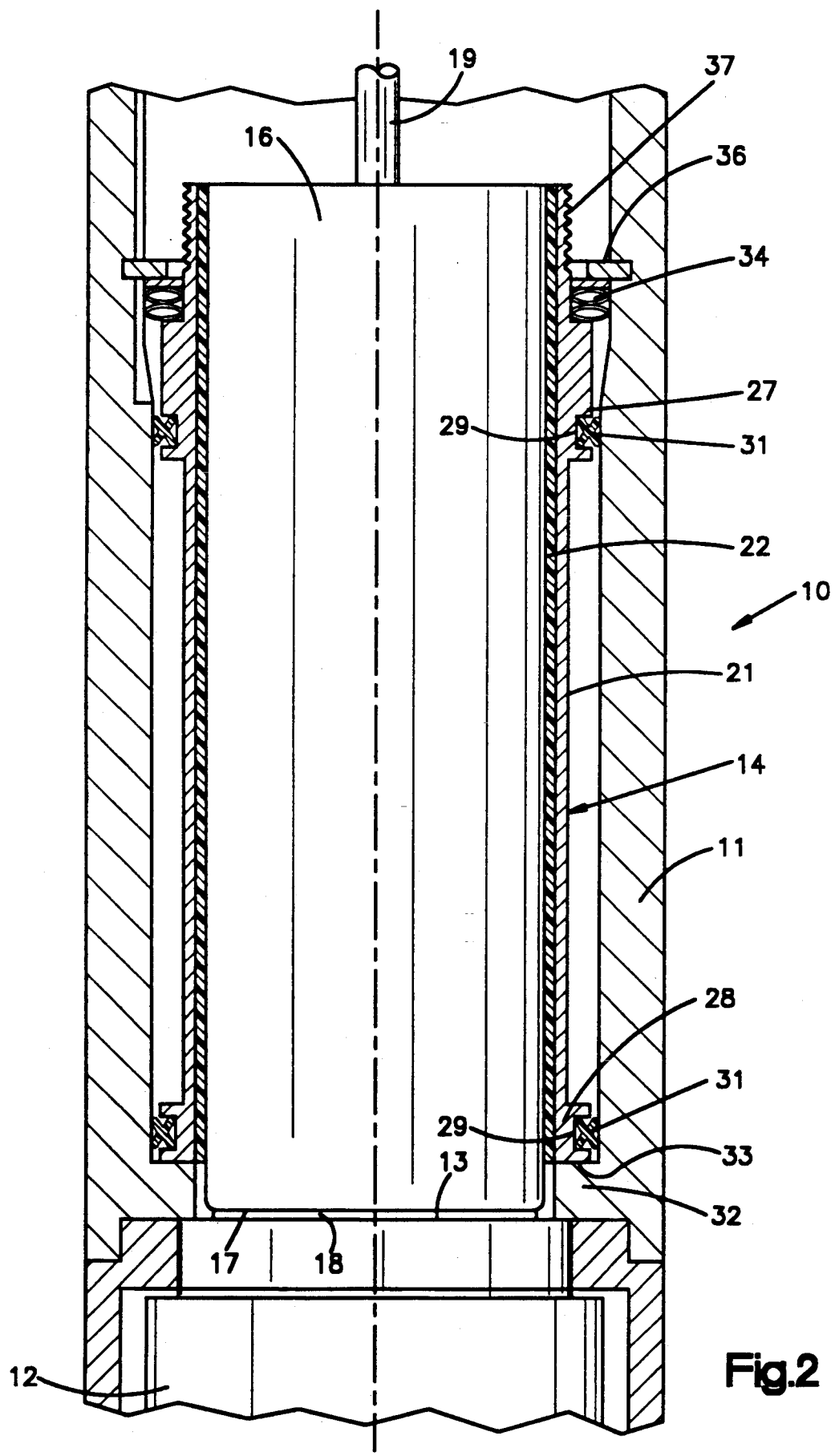
FIG. 2 is an enlarged, fragmentary view of the portion of the radiation detector enclosing and supporting the photomultiplier tube.

Referring to FIG. 2, the mounting system for the photomultiplier tube includes a support tube 21 which surrounds the peripheral surface of the photomultiplier tube 16 with a relatively close fit. The photomultiplier tube 16 is mounted within the support tube 21 by a relatively thin layer of elastomeric material 22, such as a silicone elastomer, which provides an adhesive bond between the photomultiplier tube 16 and the support tube 21, and which can withstand relatively high temperatures. The elastomeric material 22, by its nature, allows limited relative movement between the photomultiplier tube and the support tube, and functions to provide a degree of damping of any vibrations or shocks applied to the system.

Figure 3:
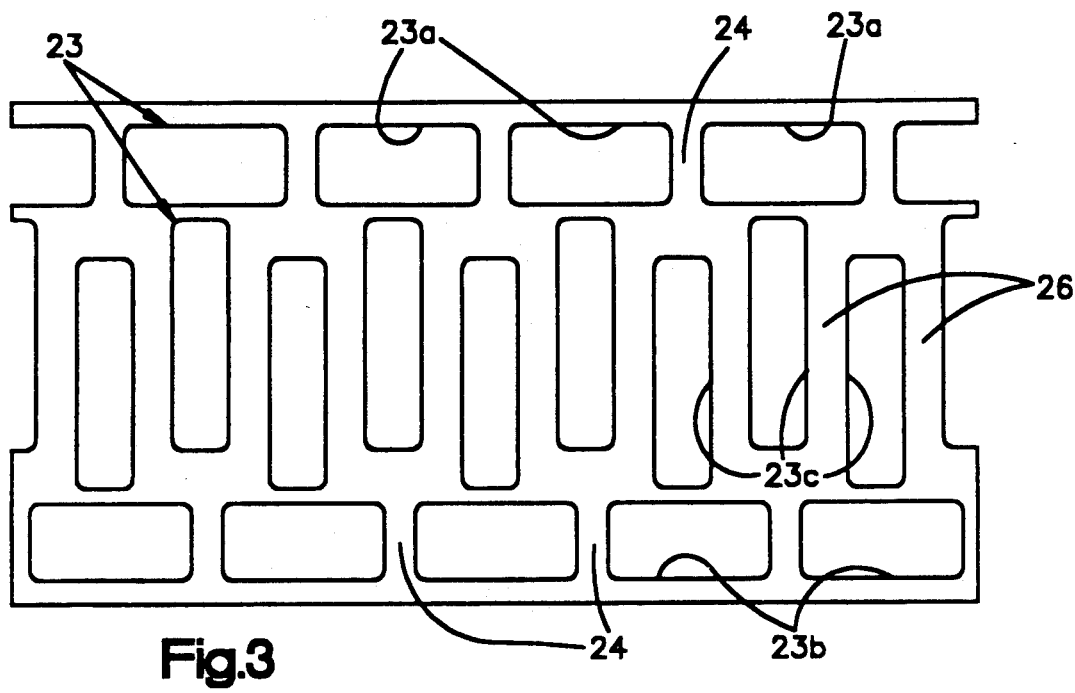
FIG. 3 is a roll-out view illustrating the pattern of slots or openings formed in the support tube to accommodate thermal expansion of elastomeric material mounting the photomultiplier tube in the support tube.

Because the elastomeric material 22 has a coefficient of thermal expansion substantially higher than the coefficient of thermal expansion of the support tube 21, the support tube is provided with a plurality of openings in its wall. FIG. 3 illustrates one preferred pattern of openings 23 formed in the wall of the support tube 21. In this pattern, a series of generally rectangular openings 23a are formed along one boundary and are positioned with their long dimension extending in a peripheral direction. A similar group of openings 23b are provided along the opposite margin of the pattern. Adjacent openings 23a and 23b are spaced by axially extending wall portions 24. Intermediate the two arrays of openings 23a and 23b, the wall is provided with axially extending openings 23c, which are again generally rectangular in shape but, in this instance, the long dimension of the rectangle extends in an axial direction. In this instance, the openings 23c are spaced from each other by wall portions 26. Also, the openings 23c are staggered in an axial direction, as best illustrated in FIG. 3.

With this pattern of openings, the wall portions 24 and 26 cooperate to provide the support tube with sufficient axial strength to withstand the various loads on the tube, while providing substantial open areas and providing the wall with substantial radial flexibility. Consequently, when the elastomeric material 22 expands at elevated temperatures, high compressive forces cannot be developed against the photomultiplier tube 16 because such thermal expansion of the elastomeric material is relieved both by radial deformation of the adjacent wall portions of the support tube 21 allowed by the flexibility thereof and elastic deformation of the elastomeric material into the openings 23.

Figure 4:
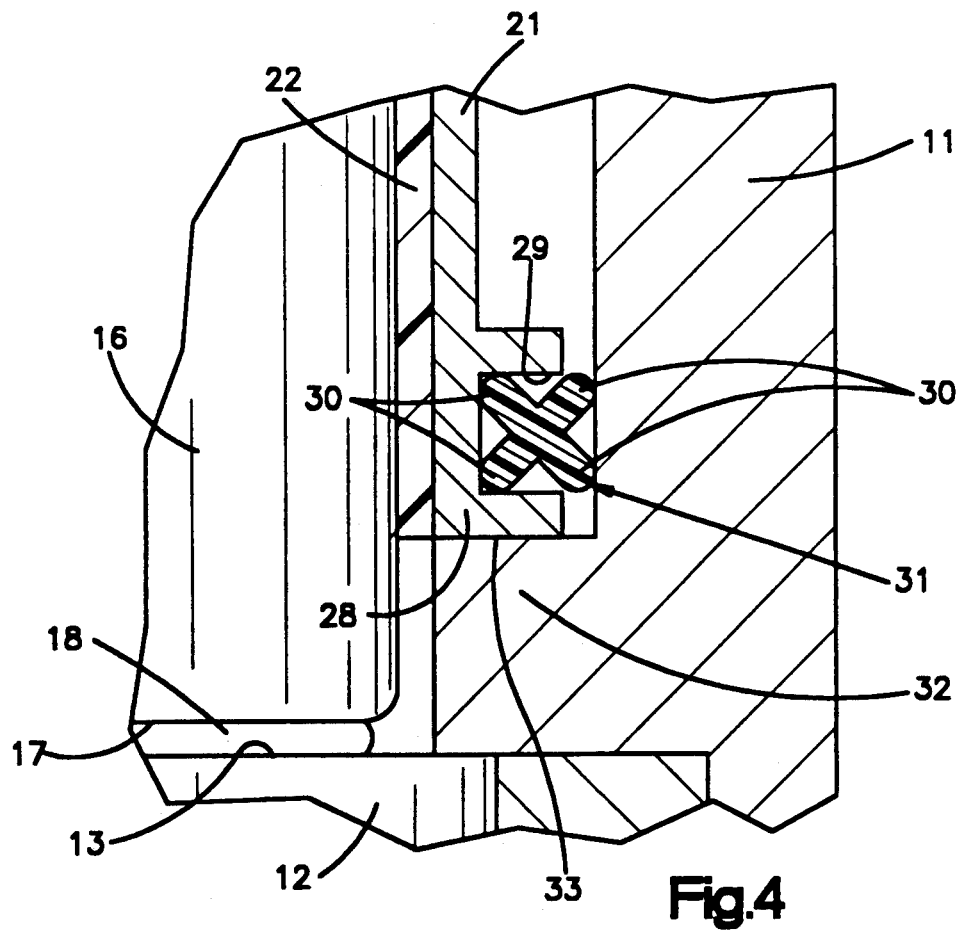
FIG. 4 is an enlarged, fragmentary view illustrating the mounting of one of the elastomeric rings resiliently positioning the support tube within the light-tight enclosure.

In order to mount the support tube 21 within the light-tight enclosure 11, an additional spring system is provided. The support tube 21 is provided with radially extending flanges 27 and 28 adjacent the ends thereof. These flanges are provided with outwardly open annular grooves 29 which face the inner wall of the light-tight enclosure 11. Positioned in each of the annular grooves 29 is an elastomeric ring which radially supports the support tube within the light-tight enclosure 11. These elastomeric rings provide a resilient mounting for the support tube within the lighttight tube, which allows a limited amount of relative radial movement therebetween to absorb and dampen vibration and shock to which the detector is exposed. Preferably, the elastomeric rings 31 are conventional quad rings commercially available and typically used as fluid seals in fluid pressure systems. These quad seals have four lobes 30, as best illustrated in FIG. 4, and provide a spring action in their support of the support tube 21. The grooves 29 are dimensioned to prestress, the quad ring to provide the necessary high spring rate required to establish the desired system resonant frequency.

The photomultiplier tube assembly is axially positioned within the light-tight assembly by engagement between the lower side of the flange 28 and the adjacent surface of a shoulder 32 formed in the light-tight enclosure 11. Therefore, a metal-to-metal engagement occurs at the interface 33 which axially positions the photomultiplier tube assembly 14 with respect to the light-tight enclosure 11 and, in turn, with respect to the scintillation cell 12. In order to maintain the engagement at the interface 33, a series of wave springs 34 are positioned between the upper side of the flange 27 and a snap ring 36 positioned within a mating groove in the light-tight enclosure. The springs 34 ensure that a face-to-face contact is maintained at the interface 33, but accommodate thermal expansion and other dimensional tolerance variations caused during the production of the parts.

The shoulder 32 and the flange 28 are accurately dimensioned to position the end plate 17 in very close proximity with the end face 13 of the scintillation cell, but spaced therefrom, so that direct contact cannot occur therebetween. A thin layer of optical coupler 18 is located between the end plate 17 and the face 13 of the cell. This coupler is preferably a silicone-type material which, when applied, is effectively a viscous fluid. After curing, the material of the optical coupler is, in effect, a self-sustaining gel. However, it cannot transmit compressive forces on the end plate 17 created by thermal expansion or the like.

The optical coupler, further, must be highly transparent to the light bursts generated within the scintillation cell so that such bursts are highly visible to the photomultiplier tube 16.

Because the tubular mass of the elastomeric material 22 is quite thin, it provides a relatively high spring rate. Similarly, the dimensions of the annular grooves 29 and the dimensions of the elastomeric rings 31 are selected so that the rings themselves provide a relatively high spring rate in a radial direction. The spring effect of the rings 31 and the elastomeric material 22 provides the entire mounting system with a resonant frequency which is substantially higher than the normal frequency of the vibrations applied to the system.

For example, if the application of the detector is expected to produce vibrations at a frequency of about 500 Hertz, the various components of the mounting system should be arranged to provide the mounting system with a resonant frequency which is substantially higher, e.g., 800 Hertz or more. In such a system, the occurrence of resonant amplification is minimal and the photomultiplier tube is not prematurely damaged. Further, thermal expansion of the elastomeric material does not produce excessive compressive forces on the shell of the photomultiplier tube. By reducing the thickness of the tubular mass of elastomeric material 22, a reduction in the volumetric expansion of such material results. Further, the provision of the openings 23 in the wall of the support tube between the flanges 27 and 28 prevents compressive stresses from being developed as a result of the thermal expansion of such material.

The flanges 27 and 28 are preferably located in zones of relatively high strength of the photomultiplier tube, but also even the elastomeric material within the flanges can distort elastically to relieve compressive stresses. The thermal expansion of the elastomeric rings 31 does not impose compressive stresses on the photomultiplier tube because the flanges 27 and 28 provide substantial strength to resist transmission of such forces. Further, because the rings 31 are quad rings, the rings themselves provide spaces to accommodate such thermal expansion.

In the event that it is necessary to disassemble the detector by removing the photomultiplier tube assembly from the light-tight enclosure 11, it is merely necessary to release the snap ring 36 and pull the assembly out of the light-tight enclosure. The end of the support tube is preferably formed with threads at 37 so that a suitable tool can be connected to the photomultiplier tube assembly for insertion or removal of the assembly 14 from the light-tight enclosure 11.

Because the interface 33 is located substantially adjacent to the inner end of the photomultiplier tube, dimensional variations created by thermal expansion and contraction are not significant at the adjacent location of the optical coupler 18.

Figure 5:
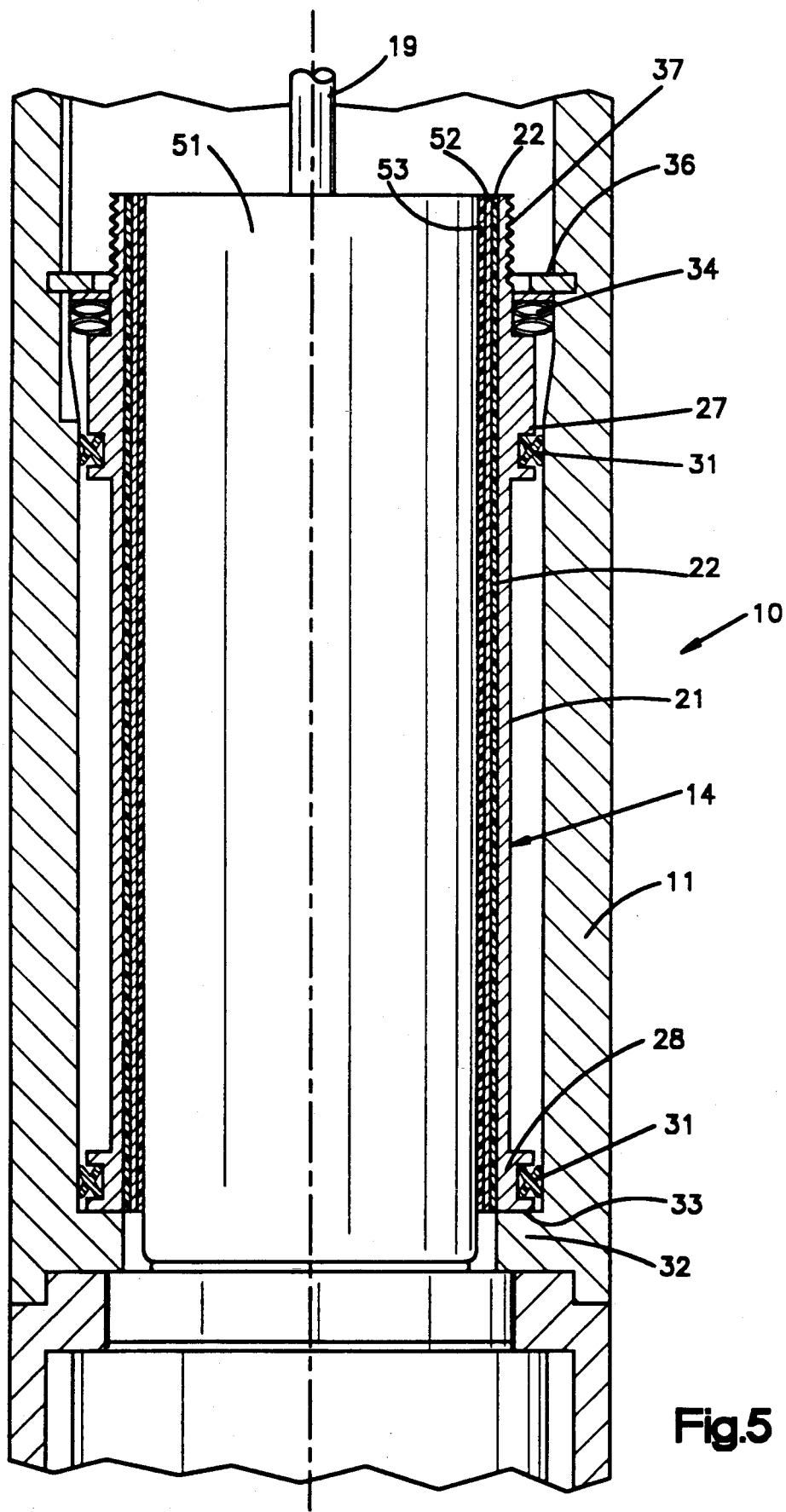
FIG. 5 is a fragmentary view, similar to FIG. 2, illustrating a second embodiment which incorporates a photomultiplier tube normally not intended for use in environments exposed to high temperature and/or high vibration loading.

FIG. 5 illustrates a second embodiment in which the photomultiplier tube within the detector is substantially more fragile than typically used in applications of the type contemplated herein. Such photomultiplier tube, because it is not built in a rugged manner to withstand severe vibration and temperature conditions, is substantially lower in cost than the type of photomultiplier tube normally used in well tool applications. In fact, the photomultiplier tube of FIG. 4 is provided with a glass envelope which is not perfectly cylindrical and is quite fragile. In this embodiment, the photomultiplier tube 51 is enclosed within a tube 52, preferably formed of glass fiber-reinforced epoxy resin which is formed accurately to a cylindrical shape so as to withstand substantial radial forces. The glass envelope of the tube itself is mounted within the fiber-reinforced glass epoxy tube 52 by a thin layer of elastomeric material 53.

The elastomeric material 53, the glass epoxy tube 52, and the photomultiplier tube 51 constitute a subassembly in which the glass epoxy tube 52 provides a strong shield around the glass envelope of the photomultiplier 51 and provides an accurately formed, cylindrical periphery even when the cylindrical shape of the photomultiplier envelope is substantially non-cylindrical. Consequently, a subassembly which can withstand substantially increased forces is provided. In this embodiment, this subassembly, consisting of the photomultiplier tube 51, the elastomeric material 53, and the glass epoxy tube 52, is installed in a mounting system in the identical manner disclosed in the first embodiment for the mounting of the photomultiplier tube 16. Consequently, the subassembly is mounted within a support tube by a tubular shaped mass of elastomeric material 22. Again, the support tube itself is supported within the light-tight tube by the rings 31.

In instances in which this second embodiment may be used, substantial cost savings are achieved, since the less ruggedly built photomultiplier tubes 51 are more reasonable than the rough duty photomultiplier tube generally used in similar applications. Here again, the mounting system provides a resonant frequency which tends to eliminate resonant amplification of vibrations, and also provides a mounting system which tends to damp out vibrations and shock. Further, because the end face of the photomultiplier tube is not subjected to any substantial force, it is not damaged.

Although the preferred embodiments of this invention have been shown and described, it should be understood that various modifications and rearrangements of the parts may be resorted to without departing from the scope of the invention as disclosed and claimed herein.

What is claimed is:

1. A photomultiplier tube and mounting system for use in environments normally subjecting the system to vibrations within a predetermined range of frequencies, comprising an elongated housing a support tube within said housing, high rate spring means extending between said support tube and housing to laterally suspend said support tube within said housing for limited relative movement, a photomultiplier tube closely fitting within said support tube, and a layer of elastomeric material extending between said photomultiplier tube and said support tube mounting said photo multiplier to be in said support tube for limited relative movement, said elastomeric material and said spring means cooperating to establish a support system for said photomultiplier tube having a resonant frequency substantially higher than said predetermined range of frequencies for minimizing amplification of said vibrations.

2. A photomultiplier tube and mounting system as set forth in claim 1, wherein said environment exposes said system to elevated temperatures causing thermal expansion of said elastomeric material, and said support tube provides relief means preventing said thermal expansion from causing damaging compressive forces on said photomultiplier tube.

3. A photomultiplier tube and mounting system as set forth in claim 1, wherein said support tube is elongated and has ends, and said spring means includes a separate spring support substantially adjacent to each of said ends.

4. A photomultiplier tube and mounting system as set forth in claim 3, wherein said spring supports are elastomeric rings.

5. A photomultiplier tube and mounting system as set forth in claim 4, wherein said support tube is generally cylindrical and provides spaced radially extending flanges adjacent its ends, the portions of said support tube between said flanges being radially expandable to relieve compressive stresses in said elastomeric material.

6. A photomultiplier tube and mounting system as set forth in claim 5, wherein said portions of said support tube provide slots rendering said portions radially expandable, said elastomeric material being elastically deformable into said slots.

7. A photomultiplier tube and mounting system as set forth in claim 1, wherein said support tube and said housing are generally cylindrical providing interengaging radially extending surfaces cooperating to axially position said support tube in said housing, and resilient means bias said interengaging surfaces toward said engagement.

8. A photomultiplier tube and mounting system as set forth in claim 7, wherein said mounting system releasably mounts said support tube in said housing for axial removal therefrom as a unit.

9. A photomultiplier and mounting system, as set forth in claim 7, wherein the photomultiplier tube has a face plate, said interengaging surfaces being substantially adjacent to said face plate.

10. A radiation detector for use in an environment exposing said detector to a predetermined range of vibration frequencies comprising a tubular housing having a first radially extending surface, a detector cell in said housing operable to produce an optical response when exposed to radiation, said cell providing an end face through which said optical response is visible, a generally cylindrical photomultiplier assembly in said housing operable to produce electrical output signals in response to said optical response of said cell, said photomultiplier assembly providing:
    (a) a generally cylindrical photomultiplier tube having a face plate at one end optically coupled to said end face of said cell;
    (b) a support tube around said photomultiplier tube secured thereto by a layer of elastomeric material;
    (c) spring means positioned between said support tube and housing laterally supporting said support tube in said housing;
    (d) said support tube providing a second radially extending surface engaging said first radially extending surface and operating to longitudinally position said face plate adjacent to said end face; and
    (e) an optical coupler optically connecting said end face and face plate, said elastomeric material and spring means cooperating to provide a resonant frequency sufficiently different from said predetermined range of vibration frequencies applied to said detector to prevent damaging amplification thereof.

11. A radiation detector system subjected to vibration within a predetermined range of frequencies, an elongated housing, a scintillation cell in said housing operable to produce light impulses in response to and as a function of radiation, said scintillation cell providing an end face through which said light is visible, an elongated photomultiplier in said housing having side walls, a support tube around said side walls of said photomultiplier tube, a layer of elastomeric material between said side walls and said support tube mounting and positioning said photomultiplier in said support tube, high rate spring means positioned between said support tube and housing resiliently laterally supporting said support tube in said housing, and an optical coupler between said photomultiplier tube and said end face providing an optical connection therebetween, said spring means cooperating with said elastomeric material and support tube to provide a system of resonant frequencies substantially above said predetermined range of vibration frequencies.

12. A radiation detector system as set forth in claim 11, wherein said support tube provides a plurality of slots adjacent said side walls of said photomultiplier tube accommodating thermal expansion of said elastomeric material when elevated temperatures are encountered.

13. A radiation detector system as set forth in claim 11, wherein said optical coupler is a gel-like viscous fluid.

* * * * *

UNITED STATES PATENT AND TRADEMARK OFFICE
CERTIFICATE OF CORRECTION

PATENT NO. : 5,070,249

DATED : December 3, 1991

INVENTOR(S) : John A. White

It is certified that error appears in the above-identified patent and that said Letters Patent is hereby corrected as shown below:

Column 7, line 24, "photo multiplier to be" should be --photomultiplier tube--.

Signed and Sealed this

Eighth Day of June, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,070,249

DATED : December 3, 1991

INVENTOR(S) : John A. White

It is certified that error appears in the above-identified patent and that said Letters Patent is hereby corrected as shown below:

Column 7, line 16, after "housing" insert --,-- (comma).

Column 7, line 23, after "mounting" insert --of--.

Column 8, line 13, after "visible," insert --and--.

Column 8, line 39, after "frequencies," insert --said system comprising--.

Signed and Sealed this

Fourteenth Day of September, 1993

Attest:

BRUCE LEHMAN

*Attesting Officer*    *Commissioner of Patents and Trademarks*